Jan. 15, 1963   W. WEIGERT   3,073,251
HYDRAULIC MACHINES
Filed Feb. 27, 1959   3 Sheets-Sheet 1

INVENTOR
Wilhelm Weigert
by:
Michael S. Striker
Attorney

Jan. 15, 1963 W. WEIGERT 3,073,251
HYDRAULIC MACHINES
Filed Feb. 27, 1959 3 Sheets-Sheet 2

INVENTOR
Wilhelm Weigert
by:
Michael S. Striker
Attorney

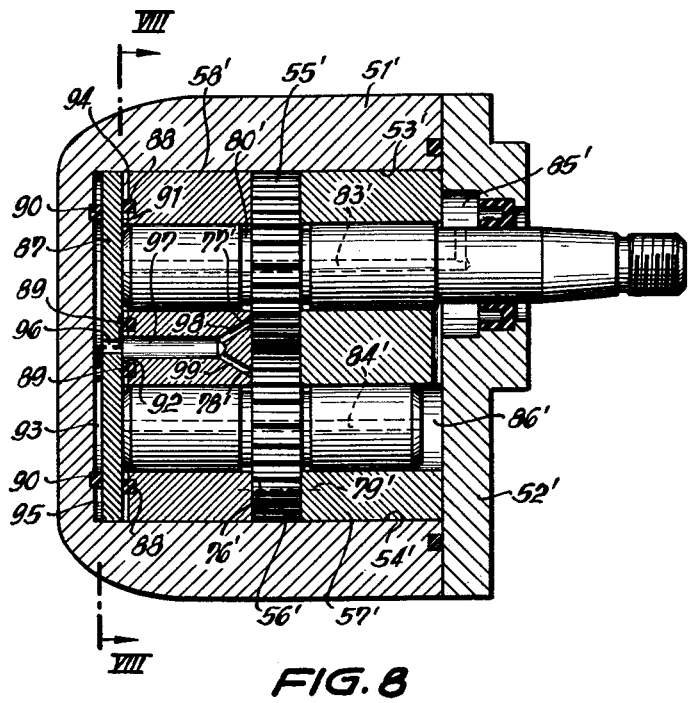

United States Patent Office 3,073,251
Patented Jan. 15, 1963

3,073,251
HYDRAULIC MACHINES
Wilhelm Weigert, Stuttgart, Germany, assignor to Robert Bosch G.m.b.H., Stuttgart, Germany
Filed Feb. 27, 1959, Ser. No. 796,139
Claims priority, application Germany Feb. 28, 1958
12 Claims. (Cl. 103—126)

The present invention relates to hydraulic machines and to rotary pumps in particular.

In rotary pumps there are bearing walls which receive the stub shafts which are fixed to the rotary member to support these shafts for rotation, and these bearing walls must fit very closely against the sides of the member. For this purpose a pressure is applied to the bearing walls to urge them toward the member, and this pressure may be provided by springs or in some cases it is derived from the fluid under pressure at the outlet of the pump. On the other hand, the fluid under pressure at the outlet of the pump forms a film located at the interface between the pump member and the bearing walls, and the pressure of the fluid at this interface opposes the pressure urging the bearing walls toward the rotary member. The fluid under pressure between the member and the bearing walls is at a variable intermediate pressure between the pressure at the inlet and the pressure at the outlet of the pump and this pressure of the fluid between the member and the bearing walls fluctuates uncontrollably and sometimes causes the bearing walls to be shifted undesirably away from the member, particularly in those cases where the pressure urging the bearing walls toward the member is not sufficiently high. Moreover, when this latter pressure is too high then with a relatively low pressure in the fluid between the member and the bearing walls the latter become undesirably pressed against the rotating member and the result is extremely high friction and wearing away of the parts.

One of the objects of the present invention is to overcome the above drawbacks by providing a hydraulic machine such as a rotary pump with a construction which will on the one hand enable a movable bearing wall to be urged with the desired pressure toward the rotary member but which on the other hand will reliably prevent undesirable shifting of the bearing wall away from the member as well as undesirably large friction and wear between the member and the bearing wall.

Another object of the present invention is to provide a hydraulic machine which will accomplish the preceding object in an extremely efficient and simple manner and with a minimum number of parts.

A further object of the present invention is to provide a pump which can accomplish the above objects even if the space available within the pump is extremely small.

With the above objects in view the present invention includes in a rotary pump which is also capable of operating as a motor when supplied with fluid under pressure, a pump housing and at least one pump member located within the housing. A pair of stub shafts coaxial with each other are coaxially fixed to the pump member and extend from the opposite faces thereof, and within the pump housing there is located at least one movable bearing wall on one side of the member and formed with at least one opening which receives the stub shaft on this one side of the member to support the latter stub shaft for rotation about its axis. In accordance with the present invention this bearing wall is formed with a passage extending therethrough from the face of the bearing wall which is directed toward the member to the face of the bearing wall which is directed away from the member, and at this latter face there is provided within the pump housing a means which forms a closed chamber communicating with this passage so that the fluid under pressure between the bearing wall and the member will communicate through this passage with the closed chamber to provide compensating forces opposed to each other acting on the opposite faces of the bearing wall.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 7 is a longitudinal sectional elevational view of a third embodiment of a pump according to the present invention; and FIG. 8 is a sectional view of the pump of FIG. 7 taken along line VIII—VIII of FIG. 7 in the direction of the arrows.

Figure 1:
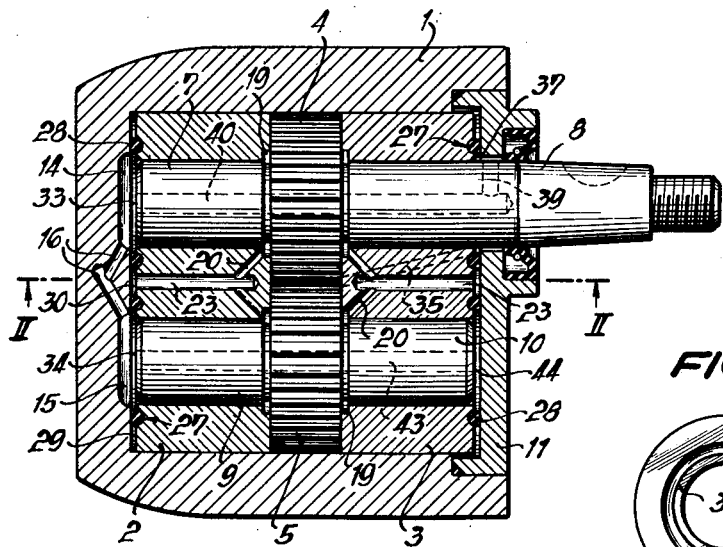
FIG. 1 is a longitudinal sectional elevational view of one embodiment of a pump according to the present invention, the section of FIG. 1 being taken along line I—I of FIG. 2 in the direction of the arrows.
Figure 3:
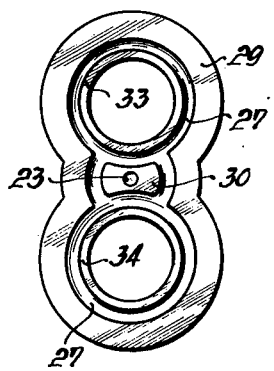
FIG. 3 illustrates a bearing wall of the structure of FIGS. 1 and 2, FIG. 3 showing the bearing wall as it appears when looking toward an end face of this bearing wall.
Figure 2:
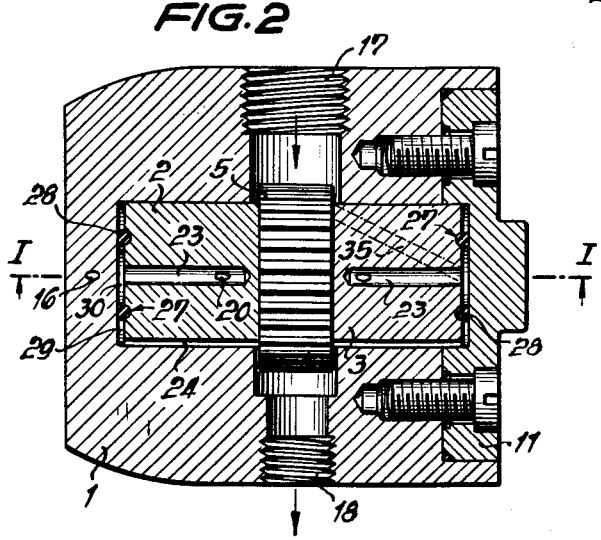
FIG. 2 is a transverse sectional view of the pump of FIG. 1, FIG. 2 being taken along section lines II—II of FIG. 1 in the direction of the arrows.

Referring now to FIGS. 1–3, there is illustrated therein a gear pump which includes the housing 1 and the bearing walls 2 and 3 located in the housing 1 with a precise sliding fit. Each of the bearing walls 2 and 3 has substantially the configuration of a figure eight (FIG. 3) and within the housing 1 there is located between bearing walls 2 and 3 the pair of meshing pump gears 4 and 5 whose axes are respectively parallel to each other. A pair of stub shafts 7 and 8 are coaxial with each other and are fixed coaxially to the gear 4 and extend from the opposite faces thereof, while a similar pair of stub shafts 9 and 10 which are coaxial with each other are fixed to and extend coaxially from the opposite faces of the gear 5. The bearing walls 2 and 3 are formed with bearing openings which respectively receive the stub shafts 7—10, as illustrated in FIG. 1, so that these bearing walls support the stub shafts and the gears 4 and 5 for rotation. The housing 1 is provided with a cover 11, and the stub shaft 8 extends fluid-tightly through and beyond the cover 11 where the stub shaft 8 has a frusto conical configuration to receive a driving gear or the like, this stub shaft 8 terminating in a threaded free end portion which is adapted to receive a nut for holding the driving gear or the like on the stub shaft 8.

It will be noted that the housing 1 is provided with an end wall distant from the cover 11, and at the inner surface of this end wall the housing 1 is formed with the recesses 14 and 15 which are respectively coaxial with and directed toward the free ends of the stub shafts 7 and 9. It will be noted that this end wall of the housing 1 is formed with a passage 16 providing communication between the recesses 14 and 15. The housing 1 is also provided, as indicated in FIG. 2, with an inlet 17 and a coaxial outlet 18 whose common axis extends normally through the plane which includes the axes of the gears 4 and 5.

The bearing walls 2 and 3 are formed at their faces which are directed toward the gears 4 and 5 with annular recesses 19 respectively surrounding the stub shafts 7—10 at the junctions between these stub shafts and the gears 4 and 5, as indicated in FIG. 1. Also, each bearing wall 2 and 3 is formed with a passage communicating with its annular recesses 19 and extending therefrom to the face of the bearing wall which is directed away from the gears. Thus, it will be seen that each bearing wall is formed with a substantially central bore 23 extending from its outer face which is directed away from the gears 4 and 5 between the stub shafts in a direction substantially parallel thereto almost up to the face of each bearing wall which is directed toward the gears 4 and 5, and at this point the passage 23 of each bearing wall communicates with a pair of branching passage portions 20 which respectively provide communication between the passage 23 and the recesses 19. Thus, fluid within the annular chambers 19 will be collected in the passages 20, 23.

Also, as is shown most clearly in FIG. 2, each of the bearing walls 2 and 3 is formed at its portion which is nearest to the outlet 18 of the pump with a groove 24 extending across the bearing wall between its opposed end faces, so that in this way the outlet of the pump, which is the part thereof of highest pressure, can communicate with those faces of the bearing walls which are directed away from the pump gears. Each of the bearing walls 2 and 3 is formed at its outer end face which is directed away from the gears with a groove 27 having the substantially figure eight configuration shown in FIG. 3, and a sealing ring conforming to the configuration of this groove 27 is received in the latter, this sealing ring 28 being located between and bearing against each bearing wall and the housing. Thus, the right sealing ring 28 of FIGS. 1 and 2 bears against the right end face of the bearing wall 3 and the cover 11, while the left sealing ring 28 of FIGS. 1 and 2 bears against the left end face of the bearing wall 2 and the wall of the housing 1 which is distant from the cover 11 thereof. In this way there is formed in the housing 1 a high pressure chamber 29 surrounding each sealing ring 28 and communicating with the outlet 18 through the groove 24 of each bearing wall. As is apparent from FIG. 3, the sealing ring 28 as well as the groove 27 has a central endless portion and a pair of additional endless portions located at the opposite sides of the central endless portion. This central endless portion of the sealing ring 28 provides a means which cooperates with each bearing wall and the housing to form a closed chamber 30 communicating with the passage 20, 23. In this way the annular chambers 19 on each side of the gears 4 and 5 communicate with the closed chambers 30 on the same side of the gears 4 and 5. Finally, it will be seen that the additional endless portions of the sealing ring 28 on the opposite sides of its central portion form inner chambers 33 and 34 surrounding the bearing openings of each bearing wall which respectively receive the stub shafts, and these inner chambers 33 and 34 communicate with the inlet 17 of the pump in a manner described below.

The bearing wall 3 is formed with a passage 35 which communicates with and leads from the inlet 17 to the end of the bore of the bearing wall 3 which receives the stub shaft 8, this end of the bore forming part of the chamber 33 at the right face of the bearing wall 3 of FIG. 1. This chamber 33 of the bearing wall 3 forms part of a larger chamber 37 formed by the cover 11 and the stub shaft 8 as well as the sealing ring 28 at the portion of the latter which defines the chamber 33 of the bearing wall 3. This chamber 37 communicates through a transverse bore 39 of the shaft 8 with a bore 40 extending axially through the shaft 8, the gear 4, and the shaft 7 to the chamber 33 of the bearing wall 2, this latter chamber 33 communicating with the recess 14. As was pointed out above, this recess 14 communicates through the passage 16 with the recess 15, and as is indicated in FIG. 1 this recess 15 communicates with the chamber 34 of the bearing wall 2. The shafts 9 and 10 as well as the gear 5 therebetween are formed with a continuous axial bore 43 passing therethrough to provide communication between the chamber 34 of the bearing wall 2 and the chamber 44 at the right end of the shaft 10, as viewed in FIG. 1, surrounded by the lower endless portion of the right sealing ring 28. In this way all of the fluid which is collected in the chambers at the ends of the stub shafts and surrounded by the outer endless portions of the sealing rings 28, which is to say the chambers 33 and 34, are placed in communication with the inlet 17.

When the above-described pump of FIGS. 1–3 is placed in communication with a fluid to be pumped and the stub shaft 8 is driven, the teeth of the gears 4 and 5 together with the housing 1 and the bearing walls 2 and 3 will form chambers which serve to pump the fluid from the inlet 17 to the outlet 18. The outer chambers 29 at the outer end faces of both bearing walls 2 and 3 adjacent the outer peripheries thereof are provided with the fluid under pressure at the pump outlet through the grooves 24 and thus it is the fluid in the chambers 29 which serves to press the bearing walls 2 and 3 axially toward the gears 4 and 5. The film of fluid at the interface between the gears 4 and 5, on the one hand, and the bearing walls 2 and 3, on the other hand, gathers in the annular chambers 19 and flows through the passages 20, 23 to the closed chambers 30 whose effective area is equal to that of the chambers 19. In other words, the effective area of each closed chamber 30 of each bearing wall is equal to the effective area of the two chambers 19 of each bearing wall. The pressure of the fluid in the chambers 19 and 30 will be at an intermediate value between the inlet pressure and the outlet pressure of the pump and depends upon such factors as the outlet pressure of the pump, the size of the gap between the bearing walls and the pump gears, or in other words the pressure urging the bearing walls toward the pump gears, as well as the play of the stub shafts in the bearing walls and the viscosity of the fluid. This intermediate pressure of the fluid in the chambers 19 and 30 is at a value substantially higher than the inlet pressure so that the range of intermediate pressure of the fluid at the interface between the pump gears and bearing walls is substantially smaller than if the annular chambers 19 were placed in communication with the inlet of the pump.

As a result of the intermediate pressure of the fluid in the chambers 19, there is available for the lubrication of the stub shafts fluid at a pressure determined by the difference between the pressure at the inlet of the pump and the intermediate pressure of the fluid in the chambers 19, and as a result there is a constant flow of a relatively small amount of lubricant along the bearing openings of the bearing walls 2 and 3.

The pressure of the fluid in the gaps between the teeth of the gears 4 and 5 continuously increases from the inlet 17 toward the outlet 18 and this fluid under pressure which is constantly increasing from the inlet toward the outlet acts on the bearing walls 2 and 3 with a certain eccentricity, but any undesirable moments which would arise from such an eccentric distribution of the fluid under pressure pumped by the gears can be compensated in a known way by a corresponding eccentric arrangement of the chambers 29. Between the base circles of the gears 4 and 5 and the outer peripheral edges of the chambers 19, at the interface between the bearing walls and the gears, there is a pressure between the pressure in the adjoining tooth gaps and the pressure in the chambers 19. Inasmuch as the pressure of the fluid in the gaps of the gear teeth continuously increases either gradually or in jumps, there will be eccentrically acting forces at the interface of the bearing walls and gears between the outer peripheral edges of the chambers 19 and the base circles of the gear teeth, and these eccentric forces can be almost completely compensated by proper design of the size and eccentric arrangement of the closed chambers 30.

Figure 4:
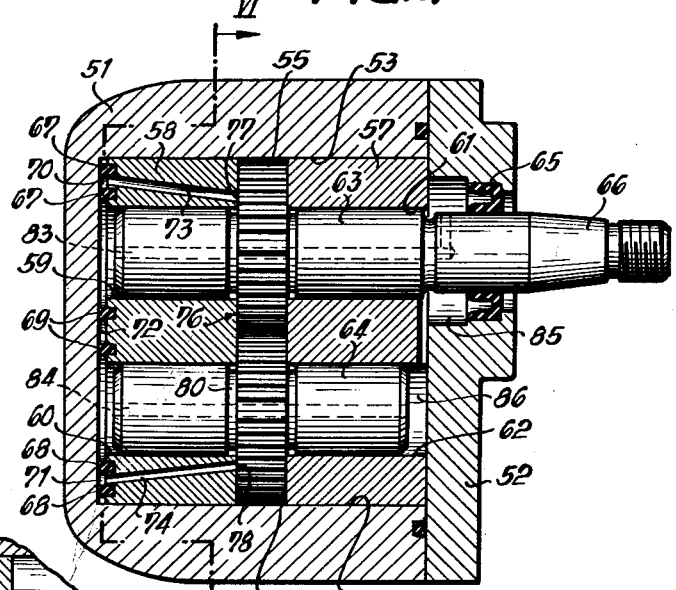
FIG. 4 is a longitudinal sectional elevational view of another embodiment of a pump according to the present invention, FIG. 4 being taken along line IV—IV of FIG. 6 in the direction of the arrows.
Figure 5:
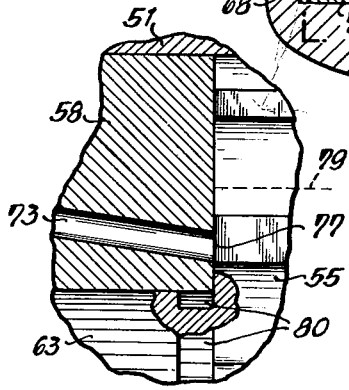
FIG. 5 is a fragmentary enlarged sectional illustration of the structure of FIG. 4 at the junction between the gear and the stub shaft connected thereto.
Figure 6:
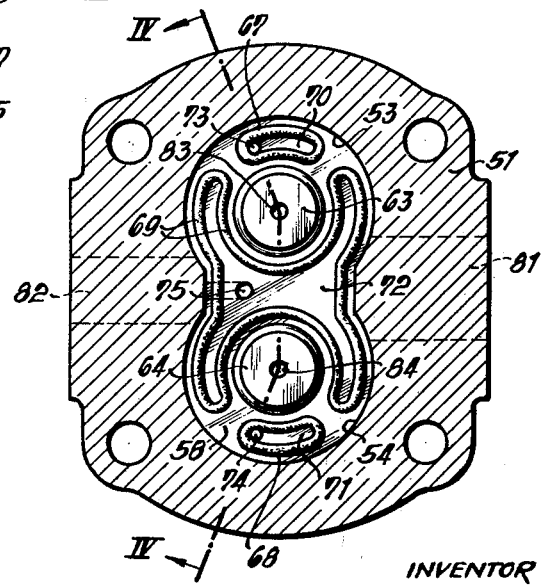
FIG. 6 is a sectional view of the pump of FIG. 4 taken along line VI—VI of FIG. 4 in the direction of the arrows.

In the embodiment of the invention which is illustrated in FIGS. 4–6, the pump includes the pump housing 51 which is provided with the cover 52. The pump housing 51 is formed with a pair of elongated openings 53 and 54 which intersect and communicate with each other and which receive the pair of pump gears 55 and 56 as well as the bearing walls 57 and 58 whose configuration conforms to that of the openings 53 and 54. The bearing walls 57 and 58 are formed with the openings 59—62 which receive the stub shafts 63 and 64, the stub shafts 63 being coaxially fixed to the gear 55 while the stub shafts 64 are coaxially fixed to the gear 56. One of the stub shafts 63 extends through an opening of the cover 52 which is provided with a sealing ring 65 to the exterior of the pump where it has a frusto conical portion 66 adapted to receive the driving gear or the like.

The bearing walls 57 and 58 are axially slidable with a precise close fit in the openings 53 and 54 of the housing 51. The left bearing wall 58 of FIG. 4 is provided with rubber sealing rings 67—69 which are received in part in correspondingly shaped grooves formed in the face of the bearing wall 58 which is directed away from gears 55 and 56, the configuration of these sealing rings being shown most clearly in FIG. 6. These sealing rings 67—69 respectively surround the areas 70—72 and cooperate with the wall of housing 51 distant from the cover 52 to form closed chambers which communicate with these areas. These areas 70—72 respectively communicate with the passages 73—75 formed in the bearing wall 58. The passages 73 and 74 lead from the areas 70 and 71 in the manner shown most clearly in FIG. 4 to the ends 77 and 78 of these passages, these ends 77 and 78 being located at parts, respectively, of the face of bearing wall 58 directed toward the gears 55 and 56 which are respectively located between the base circles 79 of the gears and the annular grooves 80 formed at the junctions between the stub shafts and the gears (FIG. 5). It will be noted that the ends 77 and 78 of the passages 73 and 74 are between the base circles of the gears and the left grooves 80 of FIG. 4 without touching the base circles or these grooves 80. The passage 75, the end of which is visible in FIG. 6, also extends through the bearing wall 58 from its left face to its right face, as viewed in FIG. 4, and this passage 75 provides communication between the area 72 and the outlet 82 of the pump. The chambers at the left side of bearing wall 58 of FIG. 4 which are located outside of the spaces surrounded by the sealing rings 67—69 communicate through the axial bores 83 and 84 of the stub shafts with the chambers 85 and 86 at the right side of the bearing wall 57 of FIG. 4, and these chambers 85 and 86 communicate in an unillustrated manner with the inlet 81 of the pump. The circular grooves 80 can also be located in part or entirely in the side surfaces of the gears or, if they are not necessitated by the manufacture of the gears and stub shafts, they may be entirely omitted.

With the embodiment of FIGS. 4–6, the bearing wall 57 will remain stationary and is pressed against the cover 52 while the gears 55 and 56 are pressed against the bearing wall 57. In turn, the bearing wall 58 is pressed against the gears 55 and 56, all of the structure within the housing 51 being urged to the right, as viewed in FIG. 4, by the fluid under pressure acting on the area 72 of the left face of the bearing wall 58, this fluid under pressure being derived from the outlet through the passage 75. At the opposite face 76 of the bearing wall 58, the areas which communicate with the ends 77 and 78 of the passages 73 and 74 are separated from the groove 80 as well as the base circles of the gears by the engagement between the face 76 and the gears 55 and 56, and the fluid at the interface between bearing wall 58 and the gears 55 and 56 can communicate through the passages 73 and 74 with the areas 70 and 71 to provide on the left face of the bearing wall 58, as viewed in FIG. 4, a pressure opposing that at the face 76 so as to produce the above-discussed advantages of the invention.

In the embodiment of the invention which is illustrated in FIGS. 7 and 8, those parts which correspond to the embodiment of FIGS. 4–6 are indicated with the same reference characters primed. In the pump of FIGS. 7 and 8 there is located between the bearing wall 58' and the wall of the housing 51' which is distant from the cover 52' thereof a partition wall 87 which has the same figure eight configuration as the bearing wall 58' and which is axially shiftable within the housing in the same way as the bearing wall 58'. The surfaces of the bearing wall 58' and the housing 51' which are directed toward the partition wall 87 are formed with grooves which receive the sealing rings 88—90 which respectively surround the surface areas 91—93. Outside of the sealing rings 88 and 90 there are provided in the housing openings 53' and 54' pressure chambers 94 and 95, respectively, which are in communication with the outlet 82' of the pump. The area 91 which is surrounded by the sealing ring 88 is, as in the embodiment of FIG. 4, in communication with the inlet 81' of the pump through the shaft bores 83' and 84' and the chambers 85' and 86' at the right side of the bearing wall 58', as viewed in FIG. 7. The partition wall 87 is formed at a substantially central part thereof with an opening 96 passing therethrough and communicating with the chamber 93 which is surrounded by the sealing ring 90. This bore or opening 96 communicates with the area 92 at the left end face of the bearing wall 58', this area 92 being surrounded by the sealing ring 89, and the area 92 communicates with a bore 97 formed in the bearing wall 58' between and extending parallel to the bores thereof which respectively receive the stub shafts. This bore 97 forms parts of a passage which includes the symmetrical branching portions 98 and 99 leading from the bore 97 to the ends 77' and 78' which are located at the right face 76' of the bearing wall 58' and which are positioned between and spaced from the base circles of the gears 55' and 56' and the grooves 80' at the junctions between the left stub shafts of FIG. 7 and the gears 55' and 56'.

It will be seen that with the embodiment of FIGS. 7 and 8 the pair of rings 89 and 90 together with the portion of the wall 87 extending between and engaged by these rings form an endless sealing ring means engaging the wall of the housing 51' which is opposite the cover 52' and also engaging the left face of the bearing wall 58' to define with these walls a closed chamber communicating through the passage 97 and its branches 98 and 99 with the face of the bearing wall 58' which is directed toward the gears 55' and 56' so as to be supplied with the oil or other fluid at an intermediate pressure between the inlet and outlet pressure urging the bearing wall 58' toward the gears 55' and 56' to compensate for the pressure of the fluid between the gears and the bearing wall 58'. In the same way, in the embodiment of FIGS. 4–6 the pair of rings 67 and 68 each form an endless sealing ring means located between and engaging the bearing wall 58 and the housing wall which is opposed to the wall 52 and defining with these walls the chamber 70 or 71 which compensates for the pressure of the fluid between the pump gears and bearing walls. Of course, in the embodiment of FIGS. 1–3, the intermediate portion of each sealing ring which surrounds the chamber 30 forms an endless sealing ring means engaging each bearing wall and the housing wall adjacent thereto to define with these walls the chamber 30 which also acts to oppose the pressure of the fluid between the gears and the bearing walls.

The embodiment of FIGS. 7 and 8 is particularly suitable for those pumps where there is no space available for counterpressure compensating chambers similar to the chambers 70 and 71 which are illustrated in FIG. 6. In the embodiment of FIGS. 7 and 8 the chamber 93 corresponds to the chambers 70 and 71 of FIG. 6, and this chamber 93 receives through the opening 96 and the passage 97—99 a fluid such as oil which is at an intermediate pressure smaller than the pressure at the outlet of the pump but higher than the pressure at the inlet of the pump. The pressure at the outlet of the pump acts on the areas 94 and 95 on both sides of the partition plate or wall 87. The chambers at the ends of the stub shafts are, as in the above-described embodiments, in communication with the suction side of the pump through the bores 83' and 84' and the chambers 85' and 86'. With the embodiment of FIGS. 7 and 8, as well as with the embodiment of FIGS. 4–6, the bearing walls engage the sides of the gears closely but with a pressure which is not too great.

If fluid under pressure is supplied to any of the above-described pumps in the reverse direction, they will then operate as motors. The pressure relationships at the bearing walls remain essentially the same with such operation. Thus, the hydraulic machines of the invention guarantee a constant pressure compensation during operation while at the same time providing unrestrained lubrication of the rotary stub shafts.

It will be understood that each of the elements described above, or two or more together, may also find a useful application in other types of hydraulic machines differing from the types described above.

While the invention has been illustrated and described as embodied in gear pumps, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a rotary pump which is capable of operating as a motor when supplied with fluid under pressure, in combination, a housing having an inlet and an outlet; at least one rotary pump member therein; a pair of stub shafts fixed to and extending coaxially from the opposite sides of the member, respectively; at least one movable bearing wall located in said housing on one side of said member and formed with at least one bearing opening which receives the stub shaft on the side of said member on which said bearing wall is located, said member having adjacent said latter shaft a continuous annular surface portion confronting said wall and said wall being formed at a portion spaced from said inlet and outlet with a passage spaced from said bearing opening and extending from a face portion of said wall which is confronted by said annular surface portion of and directed toward said member, at a part of said face which does not communicate with said inlet and outlet, to the opposite face of said wall which is directed away from said member, said housing having a wall adjacent to but spaced from said opposite face of said bearing wall; and endless sealing ring means located between and engaging said housing wall and bearing wall at said opposite face of the latter, surrounding the end of said passage at said opposite face of said bearing wall, and forming in said housing a closed chamber defined by said endless sealing ring means and the surface portions of said housing wall and said opposite face of said bearing wall which are respectively surrounded by said endless sealing ring means, said closed chamber communicating only with said passage so that the fluid located between said member and said part of said face of said bearing wall directed toward said member can flow through said passage to said closed chamber to provide in the latter fluid under pressure acting in opposition to the pressure of the fluid between said member and said part of said face of said bearing wall directed toward said member.

2. In a rotary pump as recited in claim 1, means placing at least part of the space between said housing wall and bearing wall located beyond said endless sealing ring means in communication with the outlet of the pump so that said space, at least at said part thereof, is at a relatively high pressure urging said bearing wall toward said pump member.

3. In a rotary pump which is capable of operating as a motor when supplied with fluid under pressure, in combination, a housing having an inlet and an outlet; a rotary pump member located in said housing; a pair of stub shafts fixed to the member and extending coaxially from opposite sides thereof; at least one bearing wall movable in said housing, located on one side of said member, and formed with at least one bearing opening which receives the stub shaft on said one side of said member, said member having adjacent said latter shaft a continuous annular surface portion confronting said wall and said bearing wall and the stub shaft on said one side of said member defining an annular chamber surrounded by said annular surface portion of said member and surrounding said stub shaft at its connection to said one side of said member, said bearing wall being formed at a portion spaced from said inlet and outlet with a passage spaced from said opening and extending from said annular chamber to the face of said bearing wall which is directed away from said member so that said annular chamber communicates through said passage with the latter face of said bearing wall, said housing having a wall located adjacent but spaced from said face of said bearing wall which is directed away from said member; and an endless sealing ring portion located between and engaging said housing wall and said face of said bearing wall which is directed away from said member surrounding the end of the passage at said latter face of said bearing wall to form a closed chamber surrounding and communicating only with the end of said passage at the latter face of said bearing wall so that fluid in said annular chamber and in said closed chamber will act in opposition to each other on the opposed faces of said bearing wall.

4. In a rotary pump capable of operating as a motor when supplied with fluid under pressure, in combination, a housing having an inlet and an outlet; at least one pump member located in said housing; a pair of stub shafts fixed coaxially to the member and respectively extending from opposite sides thereof; at least one bearing wall located in said housing on one side of said member and formed with at least one bearing opening respectively receiving said stub shaft on said one side of said member, said member having adjacent said latter shaft a continuous annular surface portion confronting said wall and said bearing wall being formed at a portion spaced from said inlet and outlet with at least one passage extending therethrough from the face thereof which is directed toward said member at a part of the latter face which is spaced from the outlet of the pump as well as from the junction between the stub shafts and member and which is separated from said junction and said outlet by the interfacial engagement between said annular surface portion of said member and said face of said bearing wall directed toward the same to the face of said bearing wall which is directed away from said member; and means located between said bearing wall and housing at the face of said bearing wall which is directed away from said member and forming a closed chamber in cooperation with said bearing wall and housing, said closed chamber communicating only with said passage.

5. In a rotary pump capable of operating as a motor when supplied with fluid under pressure, in combination, a housing having an inlet and an outlet; at least one pump member in said housing; a pair of coaxial stub shafts extending coaxially from the member at the opposite sides thereof; a partition wall located in said housing between a stub shaft on one side of said member and a wall of said housing, said partition wall being formed with an opening passing therethrough; a sealing ring located between and engaging said partition wall and said wall of said housing and forming with the latter walls a closed chamber communicating only with said opening passing through said partition wall; and a movable bearing wall located between said partition wall and said member and formed with a bearing opening which receives the stub shaft on the side of said member where said partition wall is located, said member having adjacent said latter shaft a continuous annular surface portion confronting said wall and said bearing wall being formed at a portion spaced from said inlet and outlet with a passage communicating with and extending from said opening of said partition wall and terminating at a face portion of said bearing wall which is directed toward said continuous annular surface portion of said member, said continuous annular surface portion of said member being located between the outlet of the pump and the junction between said member and the stub shaft which is received in said bearing opening of said bearing wall.

6. In a rotary pump as recited in claim 5, said sealing ring between said partition wall and housing wall being surrounded by a high pressure chamber between said partition wall and housing wall communicating with the outlet of the pump, and said sealing ring having substantially the same configuration as the periphery of said partition wall.

7. In a rotary pump which is capable of operating as a motor when supplied with fluid under pressure, in combination, a housing having an inlet and an outlet; a pair of rotary pump members located in said housing; a pair of parallel stub shafts respectively extending from said members at one side thereof and fixed thereto; a movable bearing wall located in said housing on said one side of said members and formed with a pair of parallel bearing openings which respectively receive the stub shafts on said one side of said members, said bearing wall having opposite end portions respectively located beyond said bearing openings thereof and respectively formed with passages spaced from said inlet and outlet and extending through said bearing wall from the face thereof which is directed away from said members at portions of the latter face adjacent the ends of said bearing wall to the face of said bearing wall which is directed toward said members at portions of the latter face which are spaced from the outlet of the pump as well as from the junctions between said members and said stub shafts on said one side of said members, said members being respectively formed adjacent said latter shafts with continuous annular surface portions respectively confronting said bearing wall and communicating with said passages; and a pair of sealing rings respectively surrounding the ends of said passages at said face of said bearing wall which is directed away from said members and pressing against said bearing wall and said housing to form a pair of closed chambers communicating only with said passages and located between the face of said bearing wall which is directed away from said member and said housing, said closed chambers being symmetrically arranged adjacent the opposite ends of said bearing wall beyond the openings thereof which respectively receive the stub shaft on said one side of said member.

8. In a rotary pump as recited in claim 7, an additional sealing ring located between and engaging said housing and the face of said bearing wall which is directed away from said members, said additional sealing ring extending in part between the bearing openings of said bearing wall and forming a third closed chamber, said bearing wall being formed with a passage providing communication between said third chamber and the part of the pump which is at the highest pressure.

9. In a rotary pump which is capable of operating as a motor when supplied with fluid under pressure, in combination, a pump housing having a pair of opposed end walls and having an inlet and an outlet; at least one pump member in said housing; a pair of stub shafts respectively fixed coaxially to said member and extending respectively from the opposite sides thereof; a pair of bearing walls respectively located in said housing between said end walls thereof and spaced from but located adjacent thereto, said pair of bearing walls being respectively located on opposite sides of said pump member and being respectively formed with bearing openings which respectively receive said stub shafts, said bearing walls being movable in said housing axially with respect to said pump member respectively toward and away from said housing end walls and said bearing walls and stub shafts defining at the junction between said pump member and shafts annular chambers respectively surrounding said shafts, and said pump member having at its opposed faces adjacent to said shafts, respectively, a pair of continuous annular surface portions surrounding said chambers, respectively, said bearing walls being respectively formed at portions spaced from said inlet and outlet with pasages which are respectively spaced from said bearing openings and which extend from said annular chambers to the outer faces of said bearing walls which are respectively directed toward said end walls of said housing; and a pair of endless sealing rings respectively located between said housing end walls and said bearing walls in engagement with said housing end walls and bearing walls and respectively surrounding ends of said passages which are located at faces of said bearing walls which are directed toward said end walls, so that said pair of endless sealing rings together with the surfaces surrounded thereby form a pair of closed chambers communicating only with said passages and through said passages with said annular chambers so that fluid between said pump member and bearing walls will flow through said passages to said closed chambers to provide between said housing end walls and bearing walls a pressure urging said bearing walls toward said pump member in opposition to the fluid pressure between said pump member and bearing walls.

10. In a rotary pump which is capable of operating as a motor when supplied with fluid under pressure, in combination, a housing having a pair of opposed end walls and having an inlet and outlet; a pair of pump members located in said housing; a pair of stub shafts coaxially fixed to each pump member and extending respectively from opposite sides thereof, the pair of stub shafts of each pump member having a common axis and the axes of said pairs of stub shafts being parallel to each other; a pair of bearing walls respectively located in said housing between said pair of pump members and said housing end walls on opposite sides of said pair of pump members, each bearing wall being formed with a pair of bearing openings which respectively receive the stub shafts on one side of the pair of pump members, said bearing walls being movable toward and away from each other axially with respect to said stub shafts and said bearing walls and stub shafts defining at the junction between said pump members and stub shafts annular chambers respectively surrounding said shafts, each pump member having adjacent to the stub shafts connected thereto a pair of continuous annular surface portions surrounding, respectively, the annular chambers at the junction between each stub shaft and pump member, and each bearing wall being formed at a portion spaced from said inlet and outlet between its pair of bearing openings with an elongated passage communicating with both of the annular chambers on the same side of said pump members as said bearing wall and extending through the latter to the outer face thereof which is directed toward the adjacent housing end wall, said passages respectively terminating at said outer faces of said bearing walls between said bearing openings of said bearing walls; and a pair of endless sealing ring portions located between and engaging, respectively, said housing end walls, on the one hand, and said bearing walls, on the other hand, said pair of endless sealing ring portions being located between said bearing openings and respectively surrounding ends of said passages at said outer faces of said bearing walls so as to define closed chambers respectively communicating only with said passages and through said passages with said annular chambers to receive fluid therefrom, the fluid in said closed chambers urging said bearing walls toward said pump members in opposition to the pressure of the fluid between said pump members and said bearing walls.

11. In a rotary pump as recited in claim 10, a pair of additional endless sealing ring portions connected to and extending from each sealing ring portion which surrounds said passage and located on opposite sides thereof, each pair of additional sealing ring portions being located between and engaging a housing end wall and a bearing wall adjacent thereto and all of said additional sealing ring portions defining additional chambers; and means providing communication between said additional chambers and the inlet of the pump, said additional chambers respectively communicating with and extending beyond the ends of the bearing openings which are at the outer faces of said bearing walls.

12. In a rotary pump as recited in claim 11, means placing the space between each bearing wall and the housing end wall adjacent thereto which surrounds all of said endless sealing ring means therebetween in communication with the outlet of the pump so as to maintain said space at a relatively high pressure urging each bearing wall toward said pump members.

References Cited in the file of this patent

UNITED STATES PATENTS

| | | |
|---|---|---|
| 2,420,622 | Roth et al. | May 13, 1947 |
| 2,665,641 | Lauck | Jan. 12, 1954 |
| 2,707,441 | Drennen | May 3, 1955 |
| 2,742,862 | Banker | Apr. 24, 1956 |
| 2,772,638 | Nagely | Dec. 4, 1956 |
| 2,792,788 | Eames | May 21, 1957 |
| 2,793,595 | Lauck | May 28, 1957 |
| 2,808,785 | Hilton | Oct. 8, 1957 |
| 2,809,592 | Miller et al. | Oct. 15, 1957 |
| 2,816,510 | Jarvis | Dec. 17, 1957 |
| 2,820,416 | Compton | Jan. 21, 1958 |
| 2,824,522 | Compton | Feb. 25, 1958 |
| 2,824,524 | Banker | Feb. 25, 1958 |
| 2,842,066 | Hilton | July 8, 1958 |
| 2,845,873 | Lapsley | Aug. 5, 1958 |
| 2,853,952 | Aspelin | Sept. 30, 1958 |
| 2,866,416 | Oliver | Dec. 30, 1958 |
| 2,876,705 | Aspelin et al. | Mar. 10, 1959 |
| 2,880,678 | Hoffer | Apr. 7, 1959 |
| 2,932,254 | Booth et al. | Apr. 12, 1960 |

FOREIGN PATENTS

| | | |
|---|---|---|
| 706,979 | Great Britain | Apr. 7, 1954 |
| 738,782 | Great Britain | Oct. 19, 1955 |
| 769,763 | Great Britain | Mar. 13, 1957 |
| 781,238 | Great Britain | Aug. 14, 1957 |
| 1,105,262 | France | June 29, 1955 |
| 1,121,180 | France | Apr. 30, 1956 |
| 1,142,537 | France | Apr. 1, 1957 |